US009826553B2

(12) United States Patent
Bergström et al.

(10) Patent No.: US 9,826,553 B2
(45) Date of Patent: Nov. 21, 2017

(54) METHODS AND APPARATUSES FOR HANDLING CONNECTION SETUPS IN A TELECOMMUNICATIONS SYSTEM

(71) Applicant: Telefonaktiebolaget L M Ericsson (publ), Stockholm (SE)

(72) Inventors: Andreas Bergström, Vikingstad (SE); Erik Eriksson, Linköping (SE); Martin Hessler, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/419,994

(22) PCT Filed: Nov. 5, 2012

(86) PCT No.: PCT/SE2012/051204
§ 371 (c)(1),
(2) Date: Feb. 6, 2015

(87) PCT Pub. No.: WO2014/025300
PCT Pub. Date: Feb. 13, 2014

(65) Prior Publication Data
US 2015/0173105 A1 Jun. 18, 2015

Related U.S. Application Data

(60) Provisional application No. 61/681,771, filed on Aug. 10, 2012.

(51) Int. Cl.
*H04W 72/08* (2009.01)
*H04W 74/08* (2009.01)
(Continued)

(52) U.S. Cl.
CPC ....... *H04W 74/0833* (2013.01); *H04L 5/0092* (2013.01); *H04W 72/042* (2013.01);
(Continued)

(58) Field of Classification Search
None
See application file for complete search history.

(56) References Cited

U.S. PATENT DOCUMENTS 7,990,927 B2 * 8/2011 Choi .................... H04W 72/06
370/335
2004/0229624 A1 * 11/2004 Cai ....................... H04L 1/1657
455/449
(Continued)

FOREIGN PATENT DOCUMENTS

DE    EP 0993214 A1 *  4/2000  ........ H04W 74/0833
DE    EP 2400810 A1 * 12/2011  .......... H04W 74/085
(Continued)

OTHER PUBLICATIONS

4G LTE/LTE-Advanced for Mobile Broadband by Erik Dahlman et al.; Academic Press; ISBN: 978-0-12-385489-6, 2011.
(Continued)

*Primary Examiner* — Michael J Moore, Jr.
*Assistant Examiner* — Ayanah George
(74) *Attorney, Agent, or Firm* — Patent Portfolio Builders, PLLC

(57) ABSTRACT

Embodiments of the present disclosure generally relate to handling of connection setups. More particularly, they relate to a method performed in a UE (4) for requesting a connection set up with a network node (2). The UE (4) receives a signal comprising a set of classifying parameters and based on these parameters determines at least one class to which it belongs to. The UE (4) also receives a PRACH preamble scheme associated with said class to be used by the UE (4) during a connection setup request. The method further controls the timing of transmitting at least one request, signal for requesting a connection setup with the network node (2) according to the received PRACH preamble
(Continued)

scheme. Embodiments herein also relate to a method performed in a network node (2), and to a network node (2) and to a UE (4).

15 Claims, 9 Drawing Sheets

(51) Int. Cl.
  *H04W 74/00* (2009.01)
  *H04L 5/00* (2006.01)
  *H04W 72/04* (2009.01)
  *H04W 76/02* (2009.01)
(52) U.S. Cl.
  CPC ........ *H04W 74/006* (2013.01); *H04W 72/048* (2013.01); *H04W 72/08* (2013.01); *H04W 76/02* (2013.01)

(56) References Cited

U.S. PATENT DOCUMENTS

| | | | |
|---|---|---|---|
| 2008/0232317 A1* | 9/2008 | Jen ..................... | H04W 74/002 370/329 |
| 2009/0268666 A1 | 10/2009 | Vujcic | |
| 2010/0232018 A1* | 9/2010 | Kobayashi ............... | B32B 7/12 359/488.01 |
| 2010/0290407 A1* | 11/2010 | Uemura ............ | H04W 74/0866 370/329 |
| 2011/0053589 A1* | 3/2011 | Kimura ................ | H04W 16/10 455/424 |
| 2012/0122466 A1* | 5/2012 | Johansson ......... | H04W 74/0833 455/452.1 |
| 2012/0149362 A1* | 6/2012 | Tooher .................. | H04W 24/10 455/423 |
| 2012/0281530 A1* | 11/2012 | Sambhwani ...... | H04W 28/0284 370/230 |
| 2013/0114516 A1* | 5/2013 | Koo ....................... | H04B 15/00 370/329 |

FOREIGN PATENT DOCUMENTS

| | | |
|---|---|---|
| EP | 0 993 214 | 4/2000 |
| EP | 2 400 810 | 12/2011 |
| GB | 2 484 922 | 5/2012 |
| WO | WO 2007/045504 | 4/2007 |

OTHER PUBLICATIONS

3GPP TS 36.321 V10.0.0 (Dec. 2010) 3rd Generation Partnership Project; Technical Specification Group Radio Access Network; Evolved Universal Terrestrial Radio Access (E-UTRA); Medium Access Control (MAC) protocol specification (Release 10), 2010.
3GPP TS 36.311 V10.3.0 (Sep. 2011) 3rd Generation Partnership Project; Technical Specification Group Radio Access Network; Evolved Universal Terrestrial Radio Access (E-UTRA); Radio Resource Control (RRC); Protocol specification (Release 10), 2011.
International Search Report for International application No. PCT/SE2012/051204, dated Feb. 13, 2013.
PCT Written Opinion of the International Searching Authority for International application No. PCT/SE2012/051204, dated Feb. 13, 2013.

* cited by examiner

METHODS AND APPARATUSES FOR HANDLING CONNECTION SETUPS IN A TELECOMMUNICATIONS SYSTEM

PRIORITY

This nonprovisional application is a U.S. National Stage Filing under 35 U.S.C. §371 of International Patent Application Serial No. PCT/SE2012/051204 filed Nov. 5, 2012, and entitled "METHODS AND APPARATUSES FOR HANDLING CONNECTION SETUPS IN A TELECOMMUNICATIONS SYSTEM" which claims priority to U.S. Provisional Patent Application No. 61/681,771 filed Aug. 10, 2012, both of which are hereby incorporated by reference in their entirety.

TECHNICAL FIELD

Embodiments of the present disclosure generally relate to handling of connection setups. More particularly, embodiments disclosed herein relate to a method performed in a user equipment for requesting a connection set up with a network node. Embodiments herein also relate to a method performed in a network node for receiving a connection setup request from a user equipment. Furthermore, embodiments of the present disclosure are directed to a user equipment and a network node.

BACKGROUND

In a typical cellular radio system, wireless terminals (also known as mobile stations and/or user equipments (UEs)) communicate via a radio access network (RAN) to one or more core networks. The radio access network (RAN) covers a geographical area which is divided into cell areas, with each cell area being served b a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC) which supervises and coordinates various activities of the plural base stations connected thereto.

The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. The 3GPP has developed specifications for the Evolved Universal Terrestrial Radio Access Network (E-UTRAN). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

3GPP Release 10 provides for a LTE random access procedure which is used in several situations: for initial access when establishing a radio link (moving from Radio Resource Control (RRC)_IDLE to RRC_CONNECTED state); to re-establish a radio link after radio-link failure; to establish uplink synchronization; or, as a scheduling request if no dedicated scheduling-request resources have been configured on the Physical Uplink Control Channel (PUCCH). The 3GPP Release 10 LTE random access procedure essentially comprises four basic steps which encompass a sequence of messages exchanged between the terminal and the eNodeB, as generally illustrated in FIG. 1. In FIG. 1, the four steps essentially correspond to the solid arrows, whereas the dotted arrows essentially correspond to control signaling for the solid arrow step which the dotted arrows precede. For example, the second step is the second arrow (dotted) and the third arrow (solid). The second arrow (dotted) tells the UE to listen to the third arrow corresponding to the second step. In the same way the fourth arrow tells the UE to transmit the fifth arrow corresponding to the third step. Further in the same way the sixth arrow tells the UE to listen to the fourth step in the RA-proceedure corresponding to the last arrow. These basic four steps are briefly discussed below.

A first step in the random-access procedure comprises transmission of a random-access preamble on the Physical Random-Access Channel (PRACH). As part of the first step of the random-access procedure, the terminal randomly selects one preamble to transmit, out of one of the two subsets defined for contention-based access as illustrated in FIG. 2. Which subset to select the preamble from, is given by the amount of data the terminal would like to (and from a power perspective can) transmit on the UL-SCH in the third random access step. A time/frequency resource to be used for these transmissions is illustrated in FIG. 3, which is understood by reading "4G-LTE/LTE Advanced for Mobile Broadband" by E. Dahlman et al, Academic Press, 2011, incorporated herein by reference. The time/frequency resource to be used is given by the common PRACH configuration of the cell, which can be further limited by an optional, UE specific mask, which limiting the available PRACH opportunities for the given UE. This is more thorough described in "3GPP TS 36.321 v.10.0.0. Medium Access Control (MAC) protocolspecification" and "3GPP TS 36.331 v.10.3.0.Radio Resource Control (RRC) protocol specification", both of which are incorporated herein by reference.

A second stop of the random access procedure comprises the Random Access Response. In the Random Access Response the eNodeB transmits a message on the DL-SCH containing the index of the random-access preamble sequences the network detected and for which the response is valid; the timing correction calculated by the random-access preamble receiver; a scheduling grant; as well as a temporary identify (TC-RNTI) used for further communication between the UE and network. A UE which does not receive any Random Access Response in response to its initial random-access preamble transmission of step 1 above within a pre-defined time window, will have considered the attempt failed, and will repeat it random access pre-amble transmission (possibly with higher transmit power) up to a number of maximum of four times, before considering the entire random-access procedure failed.

The third step of the random access procedure serves, e.g., to assign a unique identity to the UE within the cell (C-RNTI). In this third step, the UE transmits the necessary information to the eNodeB using the UL-SCH resources assigned to the UE in the Random Access Response. This message, also known as the RRC Connection Request message allows the UE to adjust the grant size and modulation scheme as well as allows for HARQ with soft combining for the uplink message.

The fourth and last step of the random-access procedure comprises a downlink message for contention resolution. The message of this fourth step is also known as the RRC Connection Setup message. Based on the contention resolution message each terminal receiving the downlink message will compare the identity in the message with identity transmitted in the third step. Only a terminal which observes a match between the identity received in the fourth step and the identity transmitted as part of the first step will declare the random-access procedure successful, otherwise the terminal will need to restart the random access procedure.

The UE power to use in the random access attempt is calculated according to a specified formula, known from "3GPP TS 36.213 v.10.6.0. Physical layer procedures", reproduced as Expression 1 below, with parameters carried in the system information. If the UE does not receive a RandomAccessResponse in the second step of the procedure, the transmit power of the following PRACH transmission is increased by a parameter delta value up until limited by the UE maximum power:

PPRACH=min{$P_{CMAX,c}(i)$,

PREAMBLE_RECEIVED_TARGET_POWER+
$PL_c$}_[dBm]    Expression 1:

In Expression 1, $P_{CMAX,c}^{(i)}$ is the configured UE transmitting power as defined in "3GPP TS 36.213 v.10.6.0. Physical layer procedures" for subframei of the primary cell and $PL_c$ is the downlink pathloss estimate calculated in the UE for the primary cell.

As currently being discussed in 3GPP Coverage Enhancements TR 36.824, incorporated herein by reference, there may be situations where a UE is unable to access the network due to RACH coverage problems, e.g., the UE may have BCCH coverage and can measure on the cell and read the cell's system information, but the network cannot not receive any random access preamble attempts from the UE because the UE is power/coverage limited, and hence the received signal in the network is thus too weak. This may be the case, for example, for a user placed indoor served by a cell with high output power.

SUMMARY

In one of its aspects the technology disclosed herein concerns apparatus, methods, and techniques for enhancing connection setups between a user equipment and a network node such that the network node may afford a better opportunity to receive and/or process uplink information, including PRACH preambles from user equipments having weak or difficult-to-receive uplink signals.

In an example embodiment and mode, the technology disclosed herein relates to a method performed in a user equipment for requesting a connection setup with a network node. The method comprises receiving a signal comprising a set of classifying parameters and determining at least one class to which the user equipment belongs to based on the received signal comprising the set of classifying parameters, receiving a Physical Random Access CHannel, PRACH, preamble scheme to be used by the user equipment during a connection setup request, said PRACH preamble scheme being associated with the at least one class the user equipment belongs to and controlling the timing of transmitting at least one request signal for requesting a connection setup with the network node according to the received PRACH preamble scheme.

In another example embodiment and mode, the technology disclosed herein relates to a user equipment used for requesting a connection setup with a network node. The user equipment comprises a communication interface arranged for wireless communication, a processor; and a memory storing computer program code which, when run in the processor, causes the user equipment to receive a signal comprising a set of classifying parameters, determine at least ore class to which the user equipment belongs to based on the received signal comprising the set of classifying parameters, receive a PRACH preamble scheme to be used by the user equipment during a connection setup request, said PRACH preamble scheme being associated with the at least one class the user equipment belongs to, and control the timing of transmitting at least one request signal for requesting a connection setup with the network node according to the received PRACH preamble scheme.

In a further example embodiment and mode, the technology disclosed herein relates to a method performed in a network node for receiving a connection setup request from a user equipment, said user equipment belonging to at least one class, which class has been determined by using a set of classifying parameters, said method comprises transmitting a PRACH preamble scheme to the user equipment for use during a connection setup request, said PRACH preamble scheme being associated with the at least one class the user equipment belongs to and receiving at least one request signal for requesting a connection setup from the user equipment according to the transmitted PRACH preamble scheme.

In yet another example embodiment and mode, the technology disclosed herein relates to a network node used for receiving a connection setup request from a user equipment, said use equipment belonging to at least one class, which class has been determined by using a set of classifying parameters, said network node comprises a communication interface arranged for wireless communication, a processor and a memory storing computer program code which, when run in the processor, causes the network node to transmit a PRACH preamble scheme to the user equipment for use during a connection set up request, said PRACH preamble scheme being associated with the at least one class the user equipment belongs to and receive at least one request signal for requesting a connection setup from the user equipment according to the transmitted PRACH preamble scheme.

Regardless the choice/combination of embodiments and modes, such as the ones mentioned above, the network can determine exactly which PRACH reception attempts and preambles to try to combine in order to improve the received signal and hence increase the probability of successful decoding to the PRACH preambles.

Furthermore, the technology disclosed herein also allows the network to know the number of repetitions needed for the preamble transmission, and hence an estimate of how had coverage the accessing wireless terminal is experiencing. Using this information, the network can determine what (if any) potential measures should or may be taken in order to ensure that the network will successfully receive the RRC Connection Request ("MSG3", a message of the third step of the random access procedure described above). Such measures may include assignment of multiple time transmission intervals (TTIs) for transmission of the MSG3, similar to TTI bundling. The number of TTIs to bundle may also be implicitly signaled based on for what PRACH attempt the grant is received.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
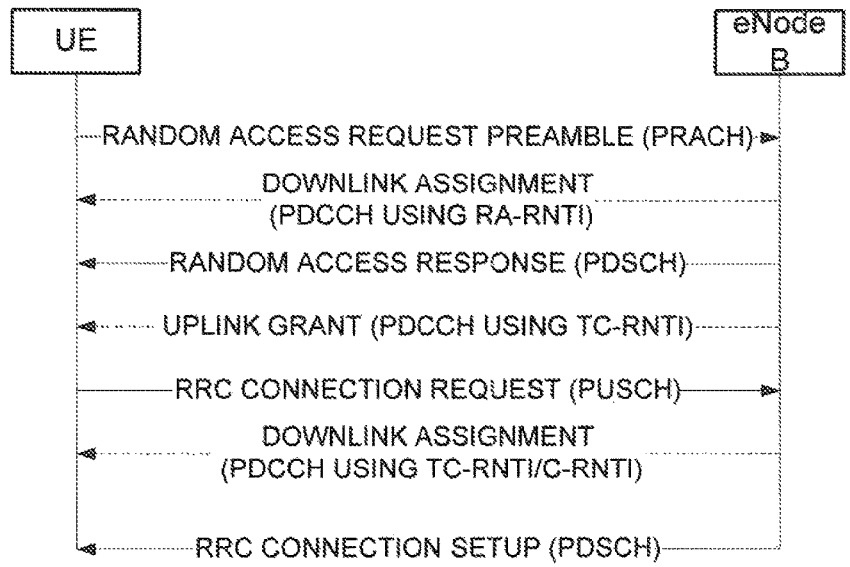
FIG. 1 is a diagrammatic view illustrating basic steps or messages included in a 3GPP Release 10 LTE random access procedure.
Figure 2:
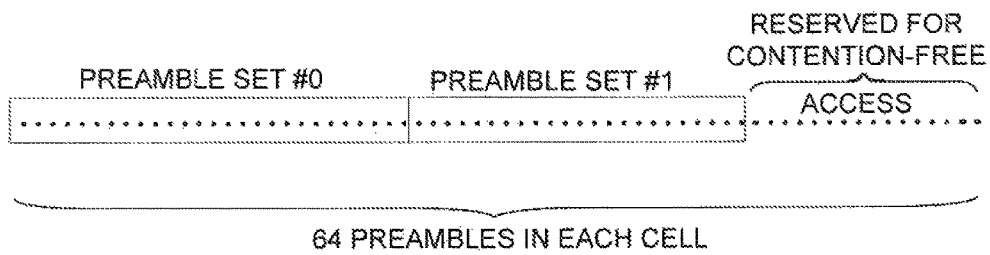
FIG. 2 is a diagrammatic view illustrating preamble subsets in Long Term Evolution (LTE).
Figure 3:
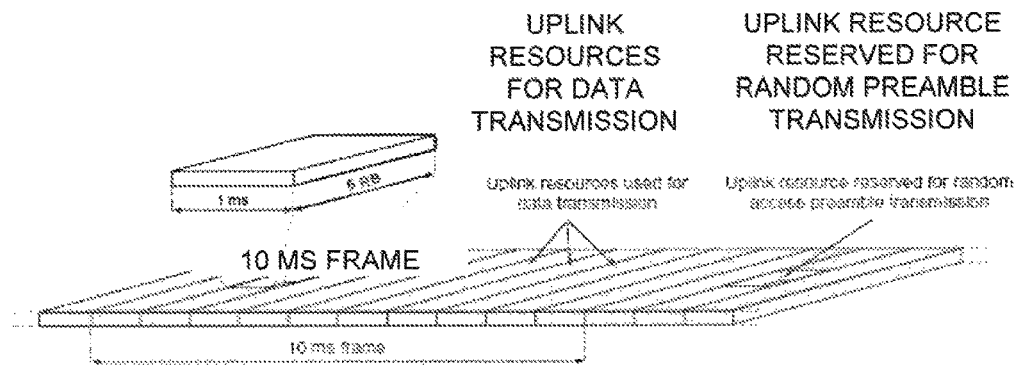
FIG. 3 is a diagrammatic view illustrating random access preamble transmission in the time frequency domain.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being her hardware-implemented and or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. As used herein, the term "node" may encompass nodes using any technology including, e.g., high speed packet access (HSPA), long term evolution (LTE), code division multiple access (CDMA) 2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

As mentioned above, there may be situations where a wireless terminal (e.g., user equipment or "UE") is unable to access the network due to RACH coverage problems, i.e. the wireless terminal may have BC CH coverage and can measure on the cell and read the system information, but the network cannot not receive any random access preamble attempts from the wireless terminal because the wireless terminal is power/coverage limited, and hence the received signal in the network is thus to weak. In this situation, it would be highly desirable if the network could combine the received signal from the various access attempts made by the UE in order to ensure a successful reception of the RACH preambles, and hence effectively extend the RACH coverage of the cell.

In this situation, it would be desirable if the network could combine the received signal from the various access attempts made by the UE in order to ensure a successful reception of the RACH preambles and hence effectively extend the RACH coverage of the cell. This is however not possible today since, according to 3GPP Rel. 10, a UE may initiate its first RACH transmission during any of the PRACH time/frequency resources that are available for the UE as determined by the cell configuration and (possibly) UE specific mask. Hence, the network cannot know which number attempt the UE is currently transmitting, and hence not correlate and combine subsequent receptions. The UE is further instructed to reselect a preamble index for each RACH attempt.

Furthermore, if the UE is coverage limited in this manner, it is quite likely that also the subsequent RRC Connection Request/MSG3 transmission from UE to NW, as per the third step of the random access procedure described in the previous section, will also fail.

Figure 4:
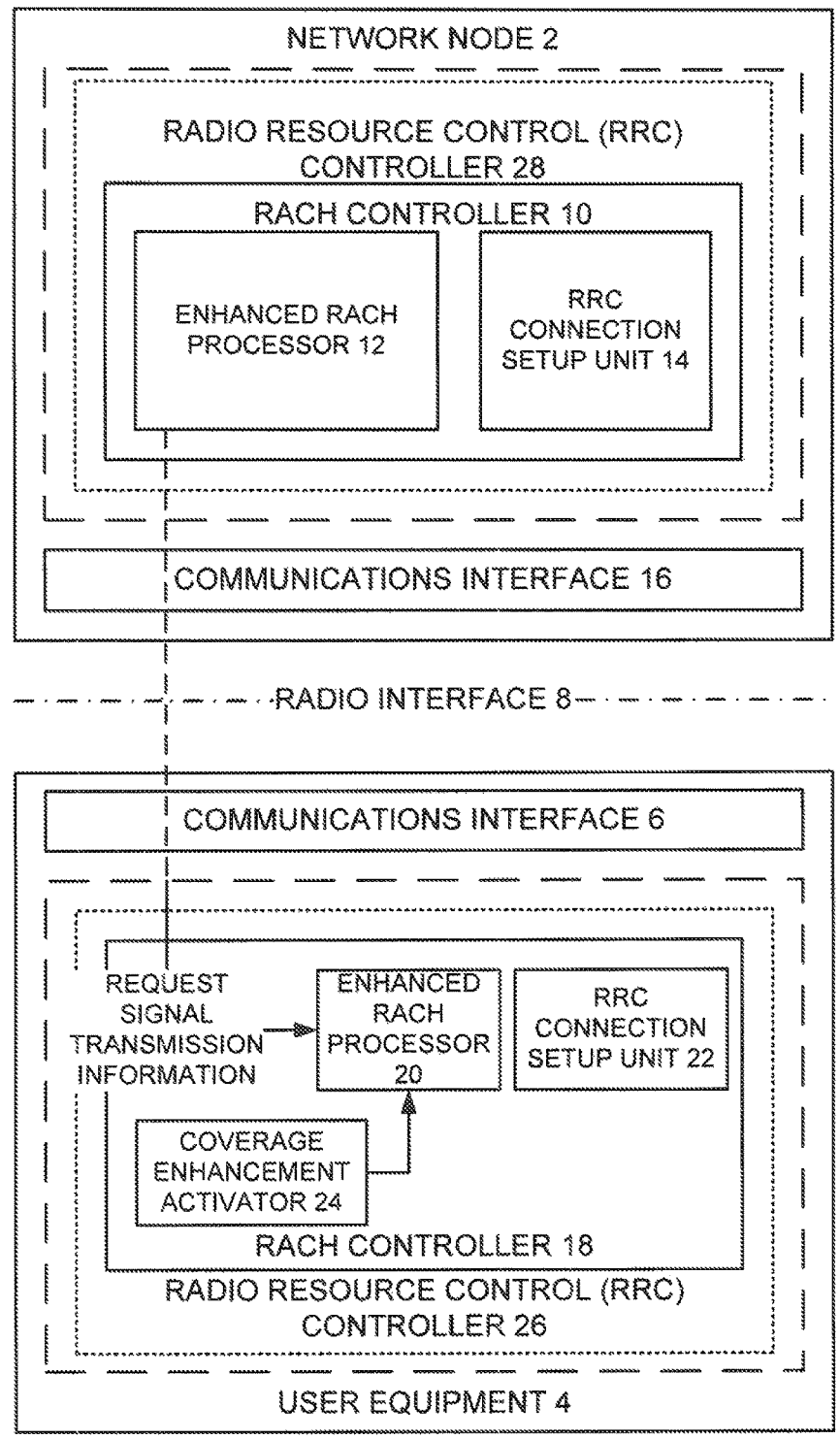
FIG. 4 is a schematic view of portions of a communications network comprising a network node and user equipment generically configured to enhance random access procedure processing.

FIG. 4 shows an example radio communications network comprising a radio access network node 2 and at least one user equipment, UE, 4 generically configured to enhance random access procedure processing according to the technology disclosed herein. The radio access network node 2 may be a base station node, also simply known as "base station". The network node 2 comprises a communications interface 16 through which the network node2 communicates on both uplink (UL) and downlink (DL) with the UE 4 over a radio or air interface 8. The radio or air interface 8 is illustrated by a dashed-dotted line in FIG. 4. The network node 2 also comprises a RACH controller 10 which, in the illustrated generic embodiment, includes functionality such as enhanced RACH processor 12 and RRC connection setup logic/unit 14. In similar manner, the UE 4 also comprises a communications interface 6 and a UE RACH controller 18. Further, the UE RACH controller 18 includes corresponding functionality such as enhanced RACH processor 20 and RRC connection setup logic/unit 22. The UE 4 may further comprise, in RACH controller 18 or elsewhere, a coverage enhancement activator 24.

The RACH processors 12, 20 of both the network node 2 and UE 4 are said to be "enhanced" by being, e.g., configured in a manner to afford the network node 2 better opportunity to receive and/or meaningfully process (e.g., combine) uplink transmissions of the random access procedure, and particularly a request signal. The request signal may take the form of an initial signal which comprises a PRACH preamble, or a repetition of such signal. The RACH processors activate their enhanced capability when the UE 4 is suspected or adjudged to be a coverage-challenged terminal, e.g., a UE 4 for which a transmission from the UE 4 to the network node 2 may be limited. That is, when the UE 4 or network has information or reason to believe that the network may have difficulty in receiving and/or using the aforementioned uplink transmissions.

In particular, the enhanced PRACH processors of both the UE 4 and network node 2 are processors configured to control and/or coordinate the timing of the request signal and/or a repetition of the request signal in a manner both different than signals for a non-challenged terminal and arranged to enhance likelihood of meaningful utilization by the network node 2 of a request from the UE 4. The processor(s) control and/or coordinate such timing in response to information which indicates that the UE 4 may be a coverage-challenged terminal. The UE 4 may obtain this information (that it is coverage-challenged) from the network node 2 (e.g., via signaling from the network node 2), or may discern or detect or surmise the coverage-challenging situation for itself, e.g., through coverage enhancement activator 24.

In situations in which enhancement of the RACH controller utilizes information from the network node 2, such information is herein also termed "request signal transmission information". The request signal transmission information may be a parameter, examples of which are provided in subsequent embodiments.

Figure 5:
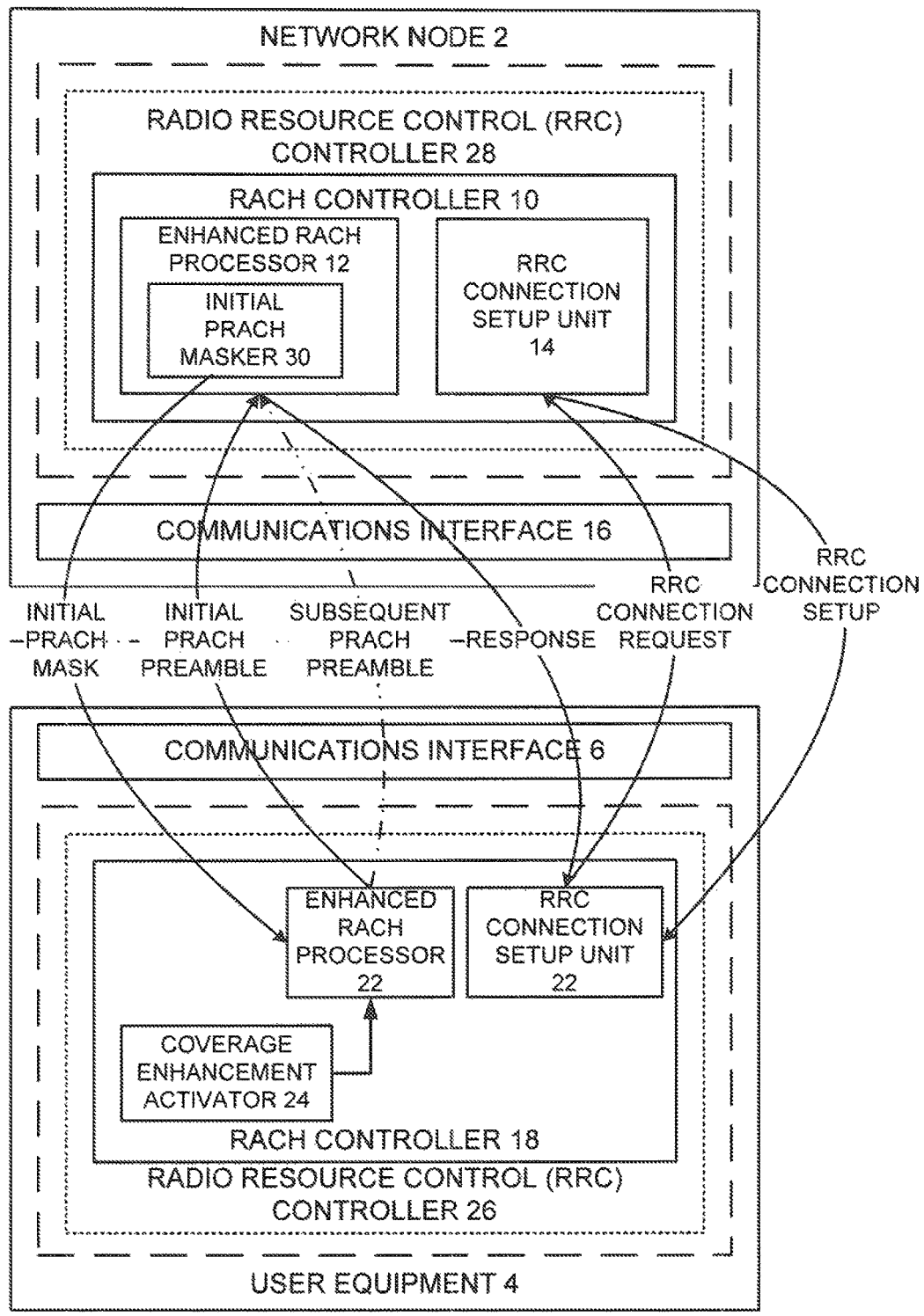
FIG. 5 is a schematic view of portions of a communications network comprising a Network node and user equipment configured to enhance random access procedure processing according to a first example embodiment and mode.

FIG. 5 illustrates a network node 2 and UE 4 configured to enhance random access procedure processing according to a first example embodiment and mode. The enhanced RACH processor 12 of the network node 2 of FIG. 5 comprises an initial PRACH masker 30. FIG. 5 also shows signals corresponding to the basic random access procedure steps discussed above, including a signal comprising the initial PRACH preamble (included in the first step); a random access procedure response (included in the second step); RRC connection request (included in the third step); and RRC connection setup signal (included in the fourth step). As shown by a broken line, one or more subsequent PRACH preambles may also be transmitted.

A technique of this example embodiment and mode is to restrict the points in time which a coverage limited UE 4 may use for its initial RACH preamble transmission. The very first preamble during the random access procedure may, for such a coverage-challenged UE 4, only be transmitted on a subset of the available PRACH time/frequency resources. Whether the UE is coverage-challenged, and thus whether the coverage enhanced random access scheme should be used, may be based on any combination of downlink path gain, calculated initial PRACH transmission power, number of previously failed random access attempts, UE class and/or type, access cause, or other factors.

Figure 6:
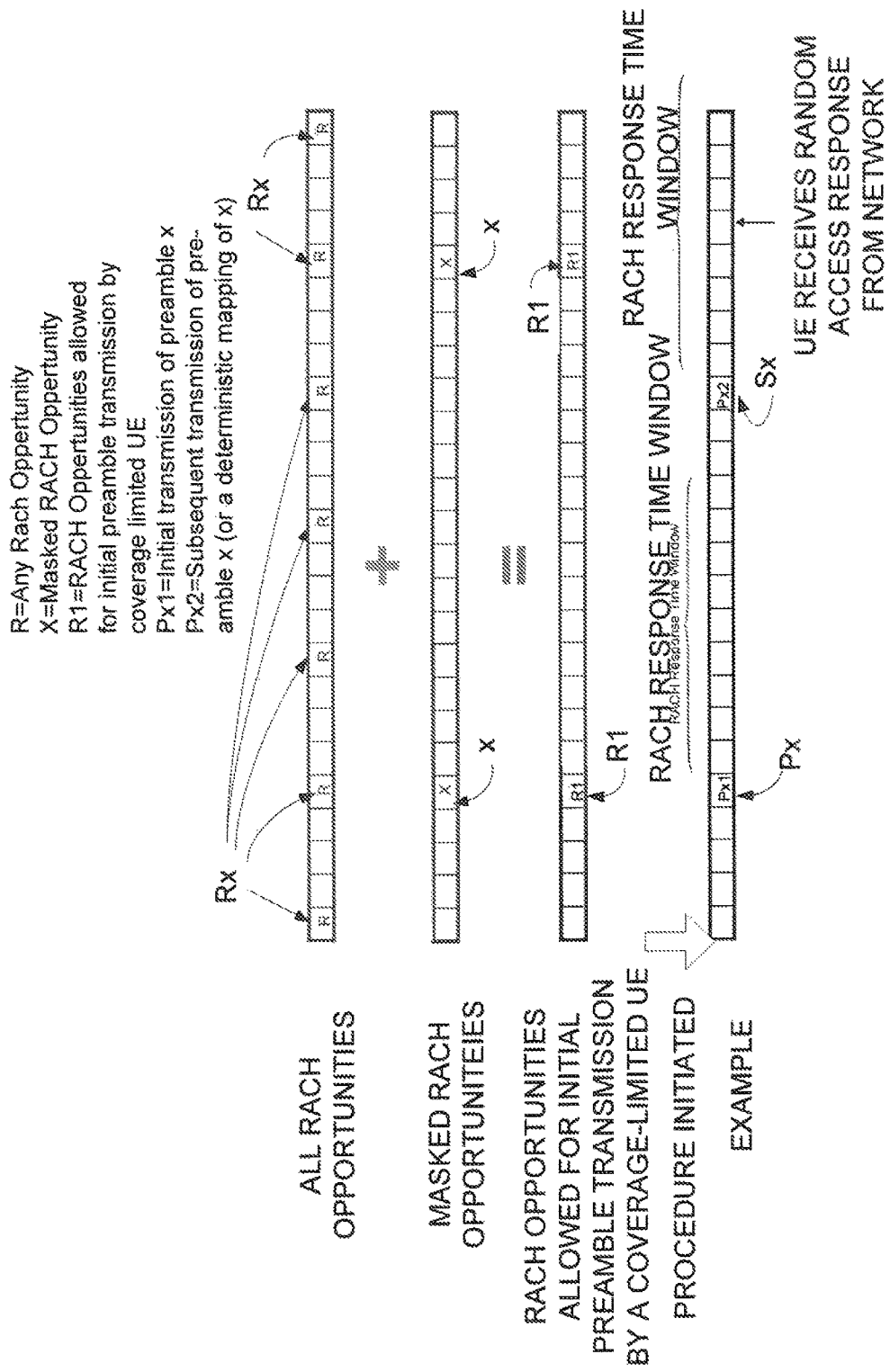
FIG. 6 is a diagrammatic view illustrating RACH transmission start instances by masking in the time domain in accordance with the first example embodiment and mode.

Subsequent re-transmissions may use any available PRACH time/frequency resource or be restricted in a deterministic manner. The waiting time between two consecutive RACH preamble transmissions is preferably in according to legacy procedures, e.g., taking into account the RACH response time window. The PRACH start instance may be different for different preamble indexes. FIG. 6 shows, by an "x" in its second line, masked RACH opportunities which correspond to the required positions (Px) for the coverage limited-wireless terminal to use for its initial RACH preamble transmission. In FIG. 6, "R" corresponds to any RACH opportunity; "x" corresponds to a masked RACH opportunity; "R1" corresponds to RACH opportunities allowed for initial preamble transition by a coverage limited wireless terminal; "Px" corresponds to an initial transmission of preamble "x"; and "Sx" corresponds to subsequent transmission of preamble "x" (or a deterministic mapping of "x").

Thus, in the example embodiment of FIG. 5, the UE enhanced RACH processor 12 is configured to control timing of the initial RACH preamble transmission so that the initial RACH preamble transmission occurs only in a predetermined resource which is unavailable to the non-coverage-challenged UE. The predetermined resource may be signaled to the wireless terminal from the network node 2, the predetermined resource being a subset of PRACH time/frequency resources.

A UE 4 with a large estimated path loss will send its first RACH preamble only on PRACH time/frequency resources as allowed by the extra PRACH mask above. Any subsequent RACH preamble transmission shall take place on the next PRACH time/frequency resource available for the wireless terminal (after potential legacy masking) whereas the waiting time between two consecutive RACH preamble transmissions shall still be according to legacy procedures, e.g., by taking into account the RACH response time window as described above. All subsequent transmissions during one and the same random access procedure use the same RACH preamble as was used during the first access preamble transmission, or the RACH preamble should be selected based on a deterministic mapping function from the initial preamble. A deterministic mapping function may comprise, for example, a fixed choice telling the wireless terminal that given that it started using index $I_0$ tells the terminal which index $I_{n-1}$ it should use in the $n^{th}$ attempt. This deterministic mapping function may, for example, be predefined in a look-up-table.

Figure 7:
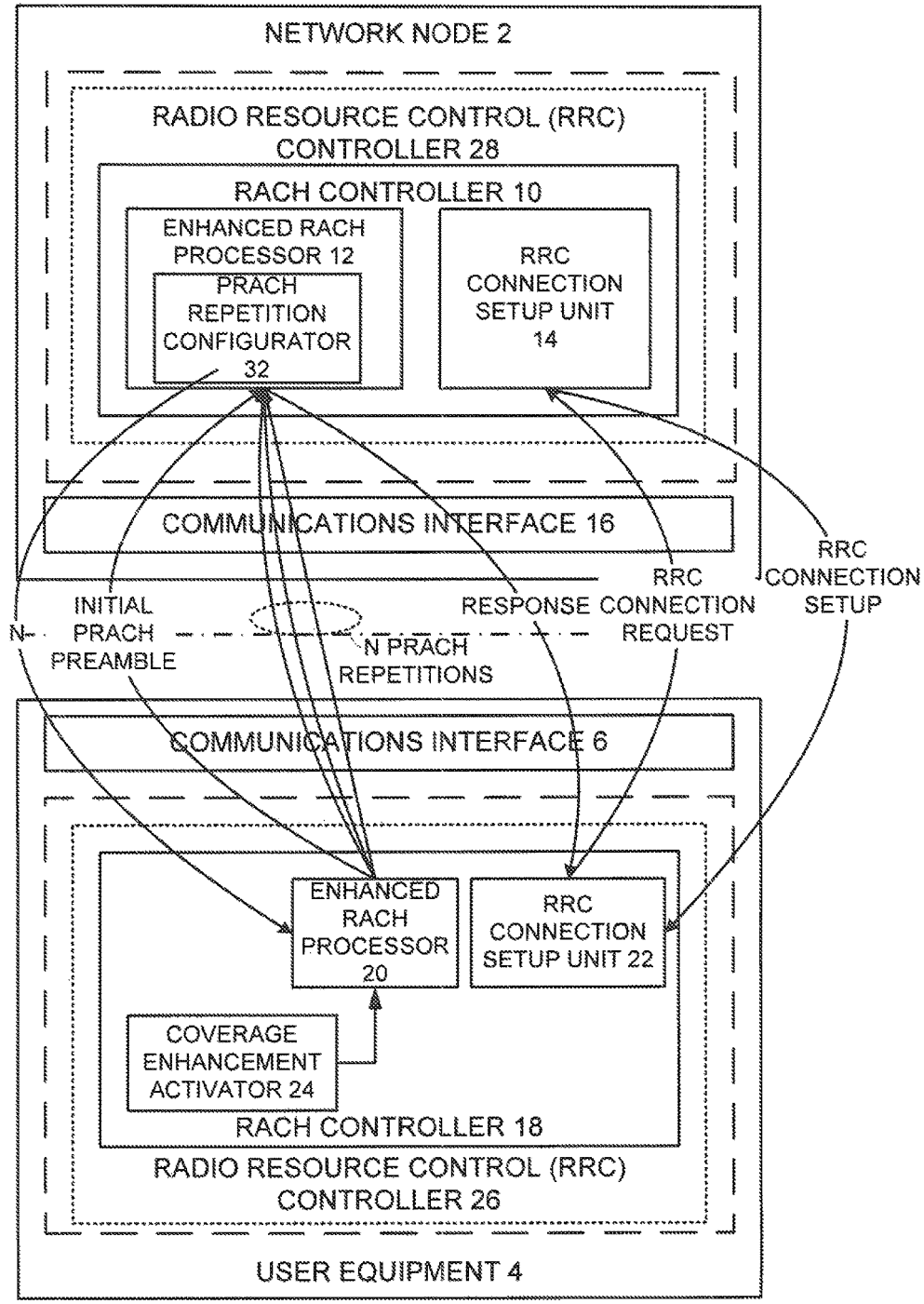
FIG. 7 is a schematic view of portions of a communications network comprising a base station. and wireless terminal generically configured to enhance random access procedure processing according to a second example embodiment and mode.

FIG. 7 illustrates a network node 2 and UE 4 configured to enhance random access procedure processing according to an example embodiment and mode. In this example embodiment and mode the request signal is considered to include an initial RACH preamble transmission. Moreover, the enhanced RACH processor 12 of the network node 2 comprises a PRACH preamble repetition configurator 32. The enhanced RACH processor 20 of the UE 4 serves to control timing of the repetition of the request signal so that an integer N number of repetitions of the request signal is/are automatically transmitted. The PRACH preamble repetition configurator 32 of the network node 2 serves to define and/or communicate to the wireless terminal the integer N (N>0).

Figure 8:
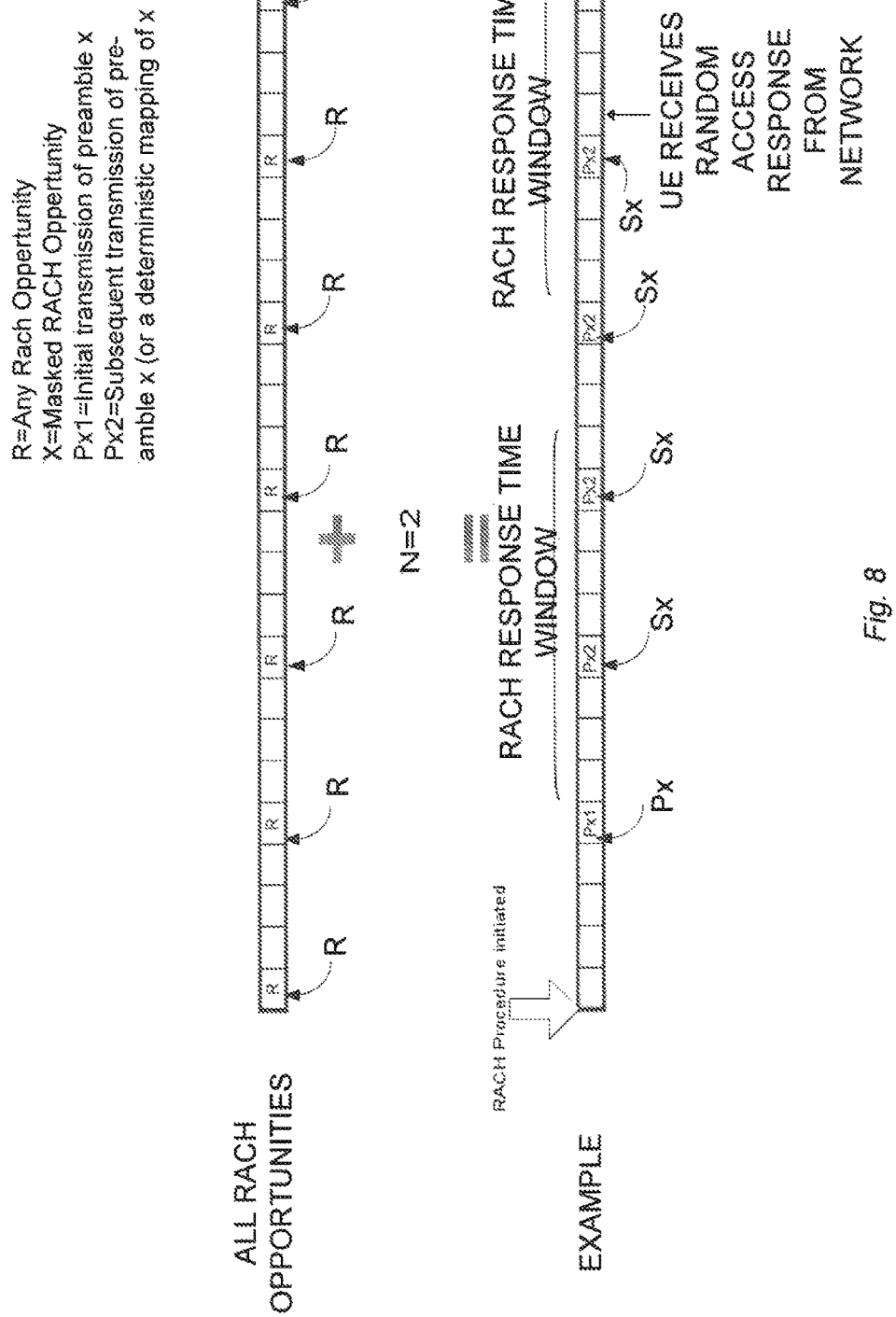
FIG. 8 is a diagrammatic view illustrating limiting the RACH transmission start instances by masking in the time domain in accordance with the second example embodiment and mode.

Thus, the FIG. 7 embodiment and mode provides the coverage-limited UE 4 with additional RACH preamble transmission opportunities to be used during a given number of immediately following possible PRACH transmission opportunities. The network (e.g., network node 2) may configure the parameter N, which is the number of times the transmission of each RACH preamble may additionally be repeated for a coverage-limited UE 4, e.g., a UE with a large estimated path loss as per the same criteria for choosing which preamble subset to use as discussed above the second step of the general random access procedure discussed above. A UE 4 with a large estimated path loss according to the above criteria will send its first and all subsequent RACH preamble transmissions according to legacy procedures, e.g., only on PRACH time/frequency resources as allowed by taking legacy PRACH masking and RACH response time window into account. Each such "original" transmission (both first and subsequent) is repeated an extra maximum of N times using the same RACH preamble as was the initial transmission during the maximum N very next PRACH time/frequency resources after each original transmission, as illustrated in FIG. 8. In particular, FIG. 8 illustrates limiting the RACH transmission start instances by masking in the time domain in accordance with an example embodiment and mode. The symbols of FIG. 8 have the same meaning as in FIG. 6, discussed above.

Figure 9:
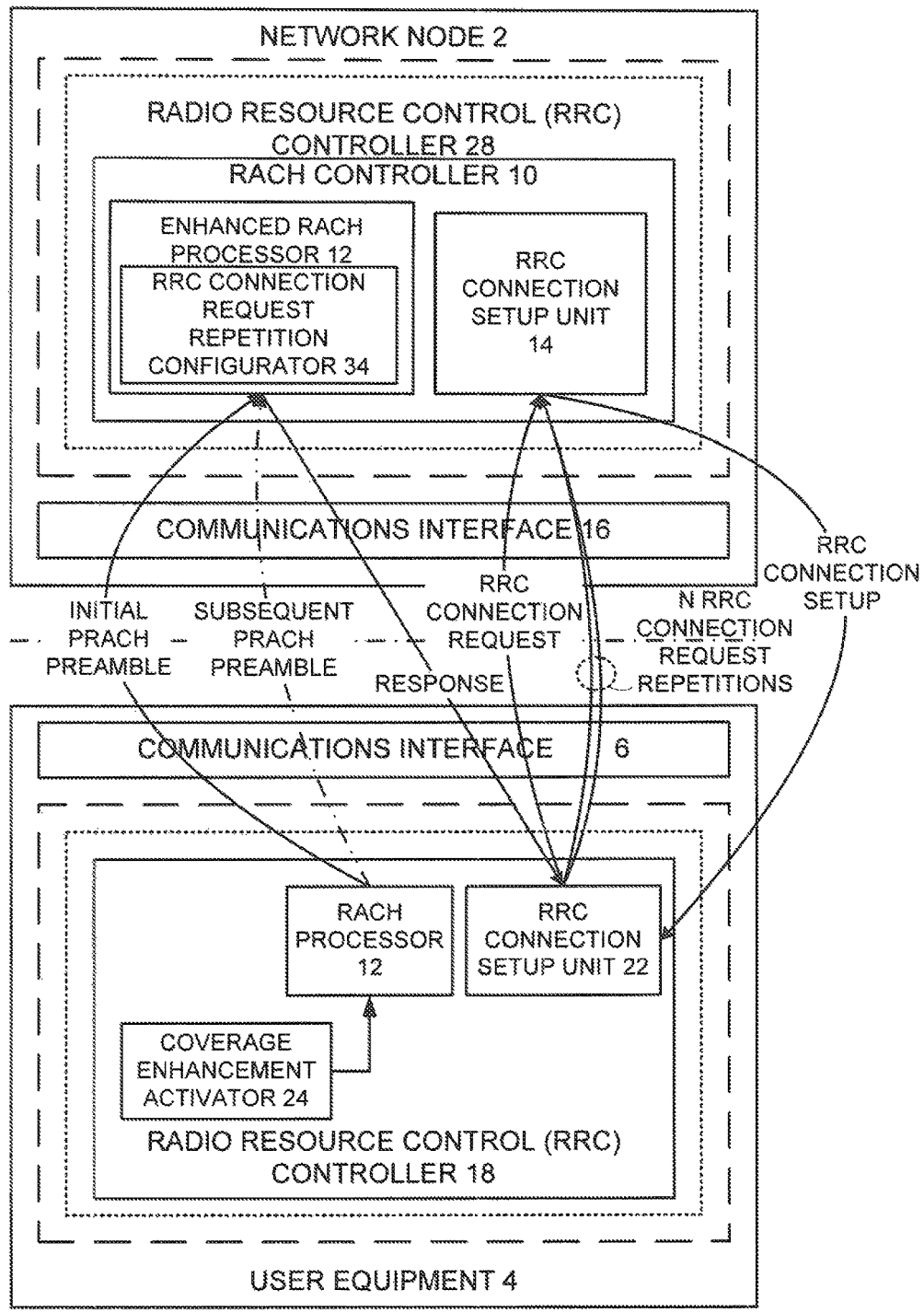
FIG. 9 is a schematic view of portions of a communications network comprising a base station and wireless terminal generically configured to enhance random access procedure processing according to a third example embodiment and mode.

FIG. 9 illustrates a network node 2 and UE 4 configured to enhance random access procedure processing according to another example embodiment and mode. In FIG. 9 the enhanced RACH processor 12 of the network node 2 comprises a RRC Connection Request Repetition Configurator 34. In the embodiment of FIG. 9, the request signal comprises a RRC connection request message, e.g., the third message or MSG3 of the random access procedure summarized above. The enhanced RACH processor 22 of the UE 4 is configured to transmit an integer N number (N>0) of repetitions of the RRC connection request message to the network node 2. The resource for this RRC connection request message, e.g., the third message in the random access procedure, is granted M the random access response issued by the network node 2. In this embodiment and mode it is assumed that, if multiple PRACH transmissions are needed to accumulate energy for detection, the same is likely to be true for the MSG3 message. In order to accommodate such assumption, multiple opportunities to transmit MSG3 are provided at the outset by being authorized in the response message of the second step of the random access procedure. By authorizing plural multiple opportunities to transmit the RRC Connection Request message, the number of retransmission attempts may be limited, along with an associated risk of signaling errors.

The bundling could, for example, be signaled in the random access response message with one or multiple bits or bit-combinations. The network node 2 may then select the bundling to use based on the number of PRACH occurrences since the PRACH start instance to the PRACH detection. This can for example, by determined using the number of repetitions needed for detection on the network node 2side, thus limited by N defined above, the start instance can be derived using the masking and/or the deterministic mapping function.

In an alternative embodiment the scaling of assigned resources may be associated with the random access attempt for with the UE receives the uplink grant. The scaling can be specified in the standard or distributed using broadcasted system information. In this alternative the UE side information about the number of random access attempts thus needs to be signaled to the network node 2 in-order to in a deterministic way scale the number of assigned resources.

An alternative to bundling many TTIs is to scale the system information parameter, maxHARQ-Msg3Tx, allowing for more retransmissions of MSG3. Similar to above a scaling factor is determined but the scaling of resources is handled dynamically using HARQ, but allowing more retransmissions to accommodate coverage limited UEs.

The RACH enhancing procedures described herein may be applied by a subset of all UEs. A UE may determine to use the coverage enhanced random access scheme based on any combination of downlink path gain, calculated initial PRACH transmission power, number of previously failed random access attempts, UE class and/or type, access cause, or other factors. The unit shown as the coverage enhancement activator represents any detector, signal processor or logic circuit that makes such determination that the wireless terminal is limited in its RACH uplink signaling, or otherwise challenged or disfavored in uplink transmissions in the random access procedure from the perspective of the network node 2. Alternatively, the unit shown as the coverage enhancement activator represents any memory or other device through which the UE stores or gains knowledge of its class, type, or other characteristics that may render suspicion regarding efficacy of its uplink transmission reception at the network node 2 for the random access procedure.

As indicated by at least some of the arrows emanating from the enhanced RACH processor of the network node 2, the network may signal parameters (more generally known as e.g., request signal transmission information) to support the selection.

The network may also signal a specific subset of preambles to use by the enhanced random access procedure, and possibly also a deterministic order in how to choose the subsequent preambles if not the same initial preamble is to be repeated for each subsequent attempt. This is the underlying information used for identifying initial and repeated random access attempts by coverage-limited wireless terminals. By knowing where the first and repeated random access attempts occur, it is possible for the base-station to combine the reception of these random access preambles in order to improve coverage on PRACH.

The technology disclosed herein affords many advantages and benefits, a non-exhaustive discussion of some now ensuing. For example, regardless the choice or combination of schemes, as described in the previous sections, since it is already know by existing procedures what set of preambles that may be used by a coverage-limited wireless terminal, using the technology disclosed herein the network may determine exactly which PRACH reception attempts and preambles to combine in order to improve the received signal and hence increase the probability of successful decoding to the RACH preambles which will improved the RACH coverage.

Furthermore, the technology disclosed herein also allows the network to know the number of repetitions needed for the preamble transmission, and hence an estimate of how bad coverage the accessing wireless terminal is experiencing. Using this information, the network can determine what (if any) potential measures that shall be taken in order to ensure that the network may successfully receive the RRC Connection Request/MSG3. Such measures could include TTI bundling like measures and/or an increase in maximum number of retransmission attempts for HARQ.

Exemplary embodiments disclosed herein provides enhanced LTE uplink connection set-up coverage at the expense of added delay for coverage limited users while the connection set-up delay of user in previous coverage are is in principle unaffected. This may be useful for example for MTC (Machine-Type-Communication) devices with low bit rate requirements deployed indoor or with a UE category with a lower maximum output power. It can also aid other services with limited uplink requirements such as broad-cast and streaming services.

In an example embodiment and as depicted by way of example in FIG. 4, FIG. 5, FIG. 7 and FIG. 9, various processors and units described herein may be hosted or otherwise comprise one or more functional units which implement the functions described herein, such as a radio resource control (RRC) controller (shown by dotted lines), for example. In both the network node 2 and wireless terminal the radio resource control (RRC) controller may in turn be realized by or comprise a machine platform. To this end FIG. 4, FIG. 5, FIG. 7 and FIG. 9 employs a broken line to represent a machine platform. The terminology "machine platform" is a way of describing how the functional units of the network node 2 and wireless terminal may be implemented or realized by machine. The machine platform may take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable for the RRC controller and its constituent functionalities is that of a hardware circuit, e.g., an application specific integrated circuit (ASIC) wherein circuit elements are structured and operated to perform the various acts described herein.

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

Nodes and terminals that communicate using the air interface also have suitable antenna(s) and radio communications circuitry, which can be included in their communication interfaces. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Figure 10:
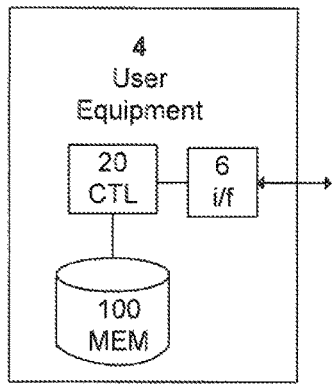
FIG. 10 is a schematic diagram illustrating some modules of an exemplary embodiment of a user equipment.

Turning now to FIG. 10 a schematic diagram illustrating some modules of an exemplary embodiment of the UE4 will be described. The UE 4 may be a mobile communication terminal, a user terminal or a mobile terminal. In an exemplary embodiment, the UE 4 is a smartphone, mobile telephone or a cellular phone. However, it is equally possible that the UE 4 could be a laptop computer, tablet computer or the like. The UE 4 comprises a controller (CTL) or a processor 20 that may be constituted by any suitable Central Processing Unit, CPU, microcontroller, Digital Signal Processor, DSP, etc capable of executing computer program code. The computer program may be stored in a memory (MEM) 100. The memory 100 can be any combination of aRead And write Memory, RAM, and aRead Only Memory, ROM. The memory 100 may also comprise persistent storage, which, for example, can be any single one or combination of magnetic memory, optical memory, or solid state memory or even remotely mounted memory. The UE 4 further comprises a communication interface (i/f) 6 arranged for wireless communication with other devices or nodes, such as the radio network node 2.

When the above-mentioned computer program code is run in the processor 20 of the UE 4 for requesting a connection setup with the network node 2 according to an exemplary embodiment, it is caused to receive a signal comprising a set of classifying parameters. Classifying parameters may be any parameters that are useful for grouping the UE 4 into a class such as a group of coverage-limited terminals. Example of parameters used to determine the UE 4 as a coverage-limited terminal may be downlink path gain, calculated initial PRACH transmission power and or number of failed random access attempts. It would also be possible to group UEs into a group of preferred subscribers, depending on the type of description they have. As will be explained below the grouping is used to control the timing of the request signal transmitted from the UE. After receiving the classifying parameters the UE 4 will determine at least one class to which it belongs based on the received signal comprising the set of classifying parameters. The UE 4 will also receive a PRACH preamble scheme as mentioned above. The PRACH preamble is used by the UE 4 during a connection setup request and is associated with the at least one class the UE belongs to. Thus, to each class there is defined a PRACH preamble scheme. One scheme may be used for one or more classes. If it is determined that the UE 4 belongs to the class of coverage-limited or challenged terminals there will be a special PRACH preamble scheme associated with such terminals. This PRACH preamble scheme will then control the timing of transmitting of at least one request signal for requesting a connection setup with the network node 2. Thus, the control of timing of transmitting the at least one request signal is with other words the same as controlling resources being a subset of PRACH time/frequency resources, as depicted in the examples of FIGS. 6 and 8. The great benefit with this approach is that it is possible to use a dedicated PRACH preamble scheme for example for coverage limited terminals. By doing this it is possible to give such terminals "special treatment" and thus increase the chances for a successful connection attempt.

In an exemplary embodiment the UE 4 is further configured to receive a PRACH preamble scheme which restricts the points in time when the UE is allowed to transmit an initial request signal, wherein in the restriction is based on a legacy RACH response time window. In other exemplary embodiments the UE 4 is enforced to reuse the same PRACH preamble selection or a predefined pattern of PRACH preambles between different attempts of transmitting the request signal.

Figure 11:
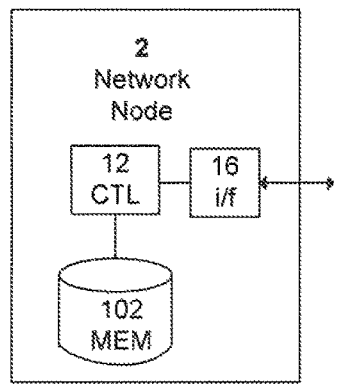
FIG. 11 is a schematic diagram illustrating some modules of an exemplary embodiment of a network node.

Turning now to FIG. 11 is a schematic diagram illustrating some modules of an exemplary embodiment of a radio network node 2 will be described. The radio network node 2 may be implemented as an Evolved Node B (eNB or eNodeB) in LTE, but may also be implemented in the radio access technology Global System for Mobile communications, GSM or Universal Mobile Telecommunications System or WiMax. The network node 2 comprises a controller (CTL) or a processor 12 that may be constituted by any suitable Central Processing Unit, CPU, microcontroller, Digital Signal Processor, DSP, etc., capable of executing computer program code. The computer program may be stored in a memory (MEM) 102. The memory 102 can be any combination of aRead And write Memory, RAM, and aRead Only Memory, ROM. The memory 102 may also comprise persistent storage, which, for example, can be any single one or combination of magnetic memory, optical memory, or solid state memory or even remotely mounted memory. The network node 2 further comprises a communication interface (i/f) 16 arranged for wireless communication with other devices or nodes, such as the UE 4.

When the above-mentioned computer program code is run in the processor 12 of the network node 2, it causes the network node 2 to transmit the PRACH preamble scheme to the UE 4 for use during a connection set up request, said PRACH preamble scheme being associated with the at least one class the user equipment 4 belongs to. The network node 2 is furthermore configured to receive at least one request signal form the UE 4 requesting a connection setup according to the transmitted PRACH preamble scheme.

Figure 12:
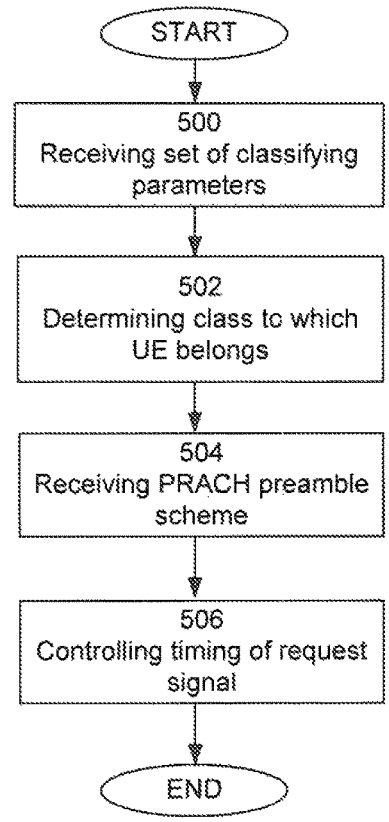
FIG. 12 is a flow chart illustrating a method performed by a user equipment according to an exemplary embodiment of the present disclosure.

With reference to FIG. 12 an exemplary method performed in the above described UE 4 for requesting a connection setup with a network node 2 will be described closer. In step 500 the UE 4 is receiving a signal comprising a set of classifying parameters and then in step 502 determining at least one class to which the UE 4 belongs to based on the received signal comprising the set of classifying parameters. In step 504 the UE 4 is receiving a PRACH, preamble scheme to be used by the UE 4 during a connection setup request said PRACH preamble scheme being associated with the at least one class the UE 4 belongs to and in step 506 controlling the timing of transmitting of at least one request signal for requesting a connection setup with the network node 2 according to the received PRACH preamble scheme.

In exemplary embodiments the PRACH preamble scheme comprises restricting the points in time when the UE 4 is allowed to transmit the initial request signal, said restricting being based on a predefined RACH response time window. The received PRAM preamble scheme may also comprise enforcing the UE 4 to reuse the PRACH preamble selection between different attempts of transmitting the request signal or use a predefined pattern of PRACH preambles between different attempts of transmitting the request signal.

Figure 13:
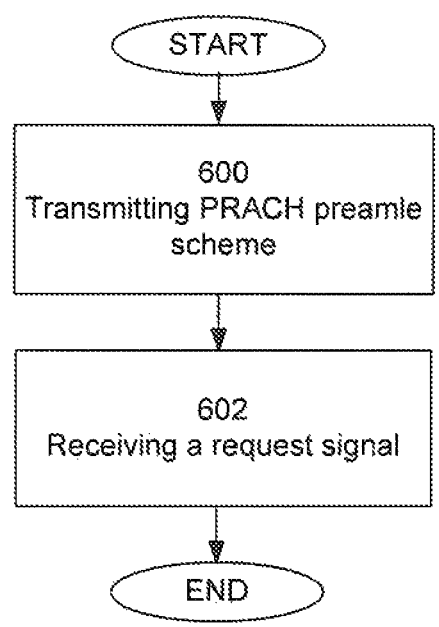
FIG. 13 is a flow chart illustrating a method performed by a network node according to an exemplary embodiment of the present disclosure.

Turning now to FIG. 13 an exemplary method performed in the network node 2 described above for receiving a connection setup request from the UE 4 will be described. Said UE 4 belonging to at least one class, which class has been determined by using a set of classifying parameters, In step 600 of the method the network node 2 is transmitting a PRACH preamble scheme to the UE 4 for use during a connection setup request, said PRACH preamble scheme being associated with the at least one class the UE 4 belongs to and in step 602 the network rode 2 is receiving at least one request signal for requesting a connection setup from the UE 4 according to the transmitted PRACH preamble scheme.

The technology disclosed thus encompasses the following non-limiting example embodiments:

Example embodiment T1 A wireless terminal which communicates over a radio interface with a network node 2, the wireless terminal comprising:
  a communications interface for transmitting at least a request signal comprising a random access procedure to the network node 2 over the radio interface;
  a processor configured, in response to information that the wireless terminal may be a coverage-challenged terminal for which a transmission from the wireless terminal to the network node 2 may be limited, to control timing of the request signal and/or a repetition of the request signal in a manner different than a non-challenged terminal to enhance likelihood of utilization by the network node 2 of a request from the wireless terminal.

Example embodiment T2 The wireless terminal of Example embodiment T1 wherein the request signal includes an initial RACH preamble transmission.

Example embodiment T3 The wireless terminal of Example embodiment T2, wherein processor is configured to control timing of the initial RACH preamble transmission so that the initial RACH preamble transmission occurs only in a predetermined resource which is unavailable to the non-coverage-challenged terminal.

Example embodiment T4 The wireless terminal of Example embodiment T3, wherein the predetermined resource is signaled to the wireless terminal from the network node 2, the predetermined resource being a subset of PRACH time/frequency resources.

Example embodiment T5 The wireless terminal of Example embodiment T1, wherein the request signal includes an initial RACH preamble transmission and the processor is configured to enhance likelihood of utilization by the network node 2 of the request by controlling timing of the repetition of the request signal so that an integer N number of repetitions of the request signal is/are automatically transmitted.

Example embodiment T6 The wireless terminal of Example embodiment T5, wherein the integer N number of repetitions of the request signal comprise a same RACH preamble as did the initial RACH preamble transmission.

Example embodiment T7 The wireless terminal of Example embodiment T1, wherein the request signal comprises a RRC connection request message and the processor is configured to transmit an integer N number of repetitions of the RRC connection request message.

Example embodiment B1A network node 2 of a radio access network which communicates over a radio interface with a wireless terminal, the network node 2 comprising:
a communications interface for receiving a request signal from the wireless terminal over the radio interface, the request signal comprising a random access procedure;
a processor configured to communicate to the wireless terminal a request signal transmission information relating to a timing of the request signal and/or a repetition of the request signal, the request signal transmission information being for use by the wireless terminal when the wireless terminal is suspected of being a coverage-challenged terminal for which a transmission from the wireless terminal to the network node 2 may be limited, the request signal transmission information being configured to enhance likelihood of utilization by the network node 2 of a request from the wireless terminal, the request signal transmission information not being usable b a non-challenged terminal.

Example embodiment B2 The network node 2 of Example embodiment B1, wherein the request signal includes an initial RACH preamble transmission.

Example embodiment B3 The network node 2 of Example embodiment B2, wherein the request signal transmission information identifies a predetermined resource required for use by the wireless terminal for the initial RACH preamble transmission.

Example embodiment B4 The network node 2 of Example embodiment B3, wherein the processor is configured to signal the predetermined resource to the wireless terminal from the network node 2, the predetermined resource being a subset of PRACH time/frequency resources.

Example embodiment B5 The network node 2 of Example embodiment B3, wherein the request signal includes an initial RACH preamble transmission and wherein the request signal transmission information identifies an integer N number of repetitions of the request signal which the wireless terminal is/are authorized to transmit automatically after the request signal.

Example embodiment B6 The network node 2 of Example embodiment B5, wherein the integer N number of repetitions of the request signal comprise a same RACH preamble as did the initial RACH preamble transmission.

Example embodiment T7 network node 2 of Example embodiment B1, wherein the request signal comprises a RRC connection request message and wherein the request signal transmission information identifies an integer N number of repetitions of the RRC connection request message which the wireless terminal is/are authorized to transmit in the random access procedure.

Example embodiment M1 A method of operating a communications system comprising a network node 2 which communicates over a radio interface with a wireless terminal, the method comprising:
obtaining information that the wireless terminal may be a coverage-challenged terminal for which a transmission from the wireless terminal to the network node 2 may be limited;
in response to information, controlling timing of the request signal and/or a repetition of the request signal in a manner different than a non-challenged terminal to enhance likelihood of utilization by the network node 2 of a request from the wireless terminal.

Example embodiment M2 The method of Example embodiment M1, wherein the request signal includes an initial RACH preamble transmission.

Example embodiment M3 The method of Example embodiment M2, further is comprising controlling timing of the initial RACH preamble transmission so that the initial RACH preamble transmission occurs only in a predetermined resource which is unavailable to the non-coverage-challenged terminal.

Example embodiment M4 The method of Example embodiment M3, further comprising signaling the predetermined resource to the wireless terminal from the network node 2, the predetermined resource being a subset of PRACH time/frequency resources.

Example embodiment M5 The method of Example embodiment M1, wherein the request signal includes an initial RACH preamble transmission, and wherein the method further comprises controlling timing of the repetition of the request signal so that an integer N number of repetitions of the request signal is/are automatically transmitted.

Example embodiment M6 The method of Example embodiment M5, wherein the integer N number of repetitions of the request signal comprise a same RACH preamble as did the initial RACH preamble transmission.

Example embodiment M7 The method of Example embodiment M1, wherein the request signal comprises a RRC connection request message and the method further comprises transmitting an integer N number of repetitions of the RRC connection request message.

Example embodiment M8 The method of Example embodiment M7, further comprising the network node 2 signaling to the wireless terminal an integer N number of repetitions.

Although the description above contains many specificities, these should not be construed as limiting the scope of the described technology but as merely providing illustrations of some of the presently described exemplary embodiments of herein. It will be appreciated that the scope of the present technology is not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a de ice or method to address each and every problem sought to be solved by the present technology, for it to be encompassed hereby.

The invention claimed is:

1. A method performed in a user equipment for requesting a connection setup with a network node, the method comprising:
   receiving, by the user equipment, a signal comprising a set of classifying parameters from the network node,
   determining, by the user equipment, at least one class to which the user equipment belongs to, based on the received signal comprising the set of classifying parameters, wherein the set of classifying parameters allow for determining the at least one class based on radio coverage that the user equipment is experiencing,
   receiving, by the user equipment, a scheme in a Physical Random Access CHannel, PRACH, preamble from the network node to be used by the user equipment for requesting the connection setup with the network node, the scheme in the PRACH preamble being associated with the at least one class the user equipment belongs to, and
   controlling the timing of transmitting at least one request signal for requesting the connection setup with the network node according to the received scheme in the PRACH preamble.

2. The method according to claim 1, wherein the received scheme in the PRACH preamble comprises restricting points in time when the user equipment is allowed to transmit an initial request signal, the restricting being based on a predefined Random Access CHannel, RACH, response time window.

3. The method according to claim 1, wherein the received scheme in the PRACH preamble comprises enforcing the user equipment to reuse PRACH preamble selection between different attempts of transmitting the at least one request signal.

4. The method according to claim 1, wherein the received scheme in the PRACH preamble comprises enforcing the user equipment to use a predefined pattern of PRACH preambles between different attempts of transmitting the at least one request signal.

5. The method according to claim 1, wherein the received scheme in the PRACH preamble comprises repeating the at least one request signal so that an integer number of repetitions of the at least one request signal are automatically transmitted.

6. The method according to claim 1, wherein the user equipment is determined to belong to a class of coverage-limited user equipments based on classifying parameters such as, downlink path gain, calculated initial PRACH transmission power, and/or number of failed random access attempts.

7. A user equipment used for requesting a connection setup with a network node, the user equipment comprising:
   a communication interface arranged for wireless communication;
   a processor; and
   a memory storing computer program code which, when run in the processor, causes the user equipment to:
      receive a signal comprising a set of classifying parameters from the network node,
      determine at least one class to which the user equipment belongs to, based on the received signal comprising the set of classifying parameters, wherein the set of classifying parameters allow for determining the at least one class based on radio coverage that the user equipment is experiencing,
      receive a scheme in a Physical Random Access CHannel, PRACH, preamble from the network node to be used by the user equipment for requesting the connection setup with the network node, the scheme in the PRACH preamble being associated with the at least one class the user equipment belongs to, and
      control the timing of transmitting at least one request signal for requesting the connection setup with the network node according to the received scheme in the PRACH preamble.

8. The user equipment according to claim 7, wherein the user equipment is further configured to receive a scheme in the PRACH preamble which restricts points in time when the user equipment is allowed to transmit an initial request signal, wherein the restriction is based on a legacy Random Access CHannel, RACH, response time window.

9. The user equipment according to claim 7, wherein the user equipment is further configured to receive a scheme in the PRACH preamble which enforces the user equipment to reuse PRACH preamble selection between different attempts of transmitting the at least one request signal.

10. The user equipment according to claim 7, wherein the user equipment is further configured to receive a scheme in the PRACH preamble which enforces the user equipment to use a predefined pattern of PRACH preambles between different attempts of transmitting the at least one request signal.

11. The user equipment according to claim 7, wherein the user equipment is further configured to receive a scheme in the PRACH preamble which repeats the at least one request signal so that an integer N number of repetitions of the at least one request signal are automatically transmitted.

12. The user equipment according to claim 7, wherein the user equipment is further configured to determine that the user equipment belongs to a class of coverage-limited user equipments based on classifying parameters such as, downlink path gain, calculated initial PRACH transmission power, and/or number of failed random access attempts.

13. A method performed in a network node for receiving a connection setup request from a user equipment, the method comprising:
   transmitting, by the network node, a signal comprising a set of classifying parameters to the user equipment, the user equipment belonging to at least one class, the at least one class being determined using the set of classifying parameters, wherein the set of classifying parameters allow for determining the at least one class based on radio coverage that the user equipment is experiencing,
   transmitting, by the network node, a scheme in a Physical Random Access CHannel, PRACH, preamble to the user equipment for use during the connection setup request, the scheme in the PRACH preamble being associated with the at least one class the user equipment belongs to, and receiving, by the network node, at least one request signal requesting for a connection setup from the user equipment according to the transmitted scheme in the PRACH preamble.

14. A network node used for receiving a connection setup request from a user equipment, the network node comprising:
- a communication interface arranged for wireless communication;
- a processor; and
- a memory storing computer program code which, when run in the processor, causes the network node to:
    - transmit a signal comprising a set of classifying parameters to the user equipment, the user equipment belonging to at least one class, which at least one class is determined using the set of classifying parameters, wherein the set of classifying parameters allow for determining the at least one class based on radio coverage that the user equipment is experiencing,
    - transmit a scheme in a Physical Random Access CHannel, PRACH, preamble to the user equipment for use during the connection set up request, the scheme in the PRACH preamble being associated with the at least one class the user equipment belongs to, and
    - receive at least one request signal requesting for a connection setup from the user equipment according to the transmitted scheme in the PRACH preamble.

15. The method according to claim 1, wherein the controlling the timing of transmitting the at least one request signal according to the received scheme in the PRACH preamble comprises controlling the timing such a predetermined PRACH resource is available to the user equipment when the user equipment belongs to a coverage-challenged class and unavailable to the user equipment when the user equipment belongs to a non-coverage-challenged class.

* * * * *